United States Patent [19]

Egerer

[11] Patent Number: 4,635,323
[45] Date of Patent: Jan. 13, 1987

[54] DRAWHEAD FOR DRAWING EQUIPMENT FOR DRAWING WOOLEN FLEECE OR THE LIKE

[75] Inventor: Josef Egerer, Schwabach, Fed. Rep. of Germany

[73] Assignee: Staedtler & Uhl, Schwabach, Fed. Rep. of Germany

[21] Appl. No.: 804,484

[22] Filed: Dec. 4, 1985

[30] Foreign Application Priority Data

Dec. 5, 1984 [DE] Fed. Rep. of Germany ....... 3444272

[51] Int. Cl.$^4$ .......................... D01H 5/02; F16C 29/04
[52] U.S. Cl. ................................................. 19/129 R
[58] Field of Search ..................................... 19/129 R

[56] References Cited

U.S. PATENT DOCUMENTS 2,211,881 8/1940 Collett .................................. 464/161
4,406,038 9/1983 Egerer .............................. 19/129 R Primary Examiner—Louis K. Rimrodt
Attorney, Agent, or Firm—Browdy & Neimark

[57] ABSTRACT

A drawhead for drawing equipment having a plurality of fallers or the like disposed parallel to each other along a closed guideway at a predetermined distance from one another. In such a drawhead it is expected to achieve the transfer of large forces parallel to the guideway in a simple manner, while avoiding all sliding friction. This is achieved by equipping each faller with at least two pivot bearing elements of differing diameters placed axially next to each other in such a way that the pivot bearing elements of adjacent fallers are disposed in such a way that two adjacent pivot bearing elements with smaller diameters adjoin each pivot bearing element with a larger diameter and that two pivot bearing elements having larger diameters adjoin each pivot bearing element with a smaller diameter.

5 Claims, 6 Drawing Figures

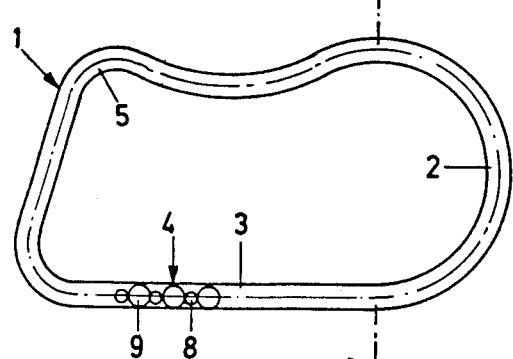
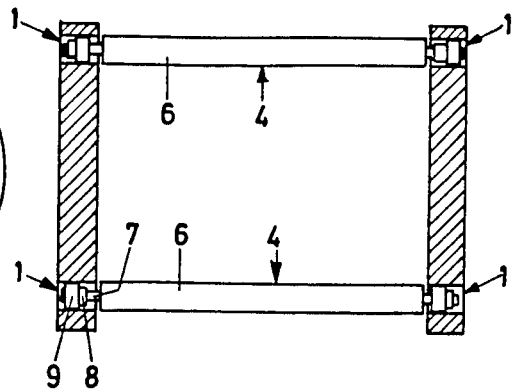
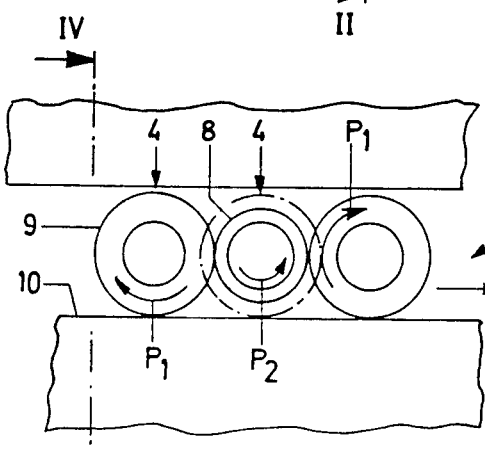
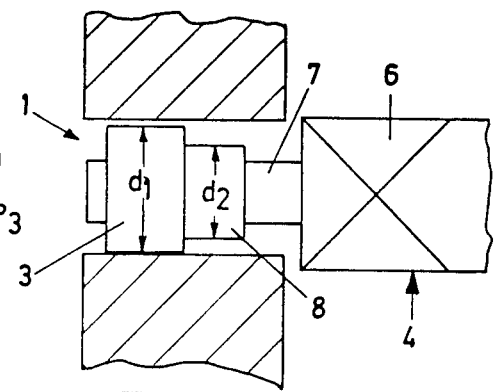
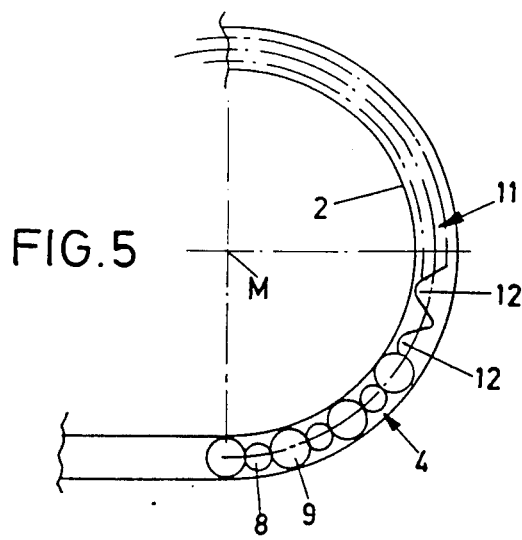

DRAWHEAD FOR DRAWING EQUIPMENT FOR DRAWING WOOLEN FLEECE OR THE LIKE

FIELD OF THE INVENTION

The invention relates to a drawhead for drawing equipment for drawing of woolen fleece or the like, wherein several fallers, disposed in a closed guideway and moving parallel to each other at a defined distance, are guided and/or propelled.

BACKGROUND OF THE INVENTION

In known drawheads of this kind the fallers used for drawing the woolen fleece or the like, which have a plurality of needles, are disposed on rotating drums, wherein the needles move in a circle. Attempts have also been made to move the fallers along the work area over a longer segment in a straight line through the material to be drawn, wherein propulsion of the fallers was made by means of gear chains. However, such gear chain drives have the basic disadvantage of being mechanically unreliable and of being very noisy.

SUMMARY OF THE INVENTION

Based on the foregoing it is the object of the present invention to develop a drawhead in such a way that the fallers can be guided quickly, correctly and dependably with little noise and wherein such guidance is also assured in case strong, perhaps even differing, forces acting in a direction opposite the propulsive force or tilting forces act on the respective fallers.

This is achieved by providing each faller with two pivot bearing elements of differing diameter placed axially adjacent in such a manner that the pivot bearings are arranged so that each larger pivot bearing element is joined in the direction of travel by two adjacent pivot bearing elements of smaller diameter, and each pivot bearing element of smaller diameter is joined in the direction of travel by two adjacent pivot bearing elements of larger diameter. The pivot axes of all pivot bearing elements are the same distance from the roller path of the guideway. The pivot bearings described therein and disposed in accordance with the present invention on the fallers assure that a purely rolling friction occurs between the several fallers, i.e. the guidance of the fallers in the guideway is accomplished by means of rolling friction as is the transfer of propelling forces acting in a longitudinal direction along the guideway and the keeping of distance in case of forces acting opposite the propulsive forces during the operation. The pivot bearings with a larger diameter assure the seating in the guideway while the rollers with smaller diameters assure the transfer of forces parallel to the guideway. The pivot bearings of smaller diameter therefore do not come into contact with the guideway. It is also assured at the same time that the pivot bearings with a larger diameter, rolling along in the same direction, do not come into contact with one another, so that any sliding friction is avoided. Because of this it also becomes possible to drive only some fallers and to transfer the propulsive force by means of the rolling contact of the respective fallers with one another, so that reliable guidance and a defined drive can be achieved even if additional forces acting against the propulsive forces appear.

In a further embodiment of the invention the drive can be provided with a regulating wheel disposed on at least one segment of the guideway having the shape of a section of an arc. The regulating wheel has equidistant recesses around its perimeter, which recesses act on the axes of the fallers. Such a regulating wheel assures an even transfer of force to a plurality of fallers, and thereby to the totality of the fallers to be driven, when driven by conventional means. Furthermore, a sure guidance along even a sharply curved section is achieved. In the case of a drive acting directly on the fallers, the regulating wheel can also serve as a take off for transfer of the movement of fallers to associated or following machines.

Where the drive for the fallers is a linear induction motor, it has been provided for such a drawhead to drive the machine elements, i.e. the needle carriers or fallers, electromagnetically by means of a linear induction motor. The drive of fallers and drawheads is already known per se from U.S. Pat. No. 4406038. However, the development in accordance with the present invention is of a decidedly practical importance for the realization of such an electromagnetic drive of fallers, since only by means of the guidance provided therein the advantage quick switchability and controllability of linear induction motors can be taken advantage of and is not seriously limited by the disadvantages inherent in mechanical components.

It is advantageous to provide for each machine element, i.e. each faller, to have at least one armature. Because of this the propulsive forces act directly on the fallers which are guided in parallel.

Further advantages, characteristics and details of the present invention can be seen from the following description of a preferred embodiment by means of the drawings.

BRIEF DESCRIPTION OF THE DRAWINGS

FIG. 1 is a schematic showing of a possible guideway for fallers;

FIG. 2 is a section along line II—II of FIG. 1;

FIG. 3 is a schematic side view of the disposition of the pivot bearing elements in the guideway in accordance with the present invention;

FIG. 4 is a section along line IV—IV of FIG. 3;

FIG. 5 is a schematic view of a regulating wheel in accordance with the present invention at a curved portion of the guideway.

DESCRIPTION OF THE PREFERRED EMBODIMENTS

Figure 6:
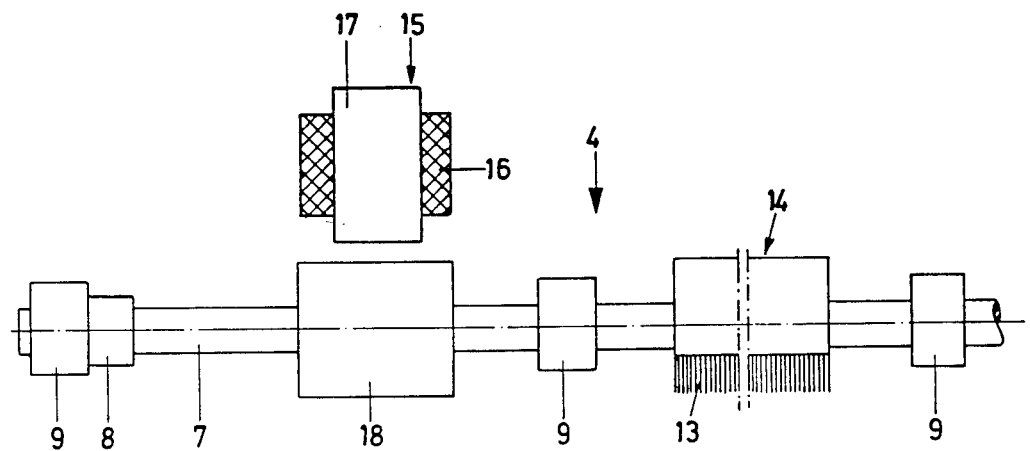
FIG. 6 is a schematic section through an apparatus in accordance with the present invention utilizing a drawhead for textile machines with a linear induction motor drive.

FIG. 1 shows a guideway by means of example to demonstrate how in accordance with the present invention, such a guideway can have completely differently developed and curved segments. Such a guideway may have, e.g. a segment 2 curved in the shape of a section of an arc and a straight segment 3, which might serve as a work area. In addition, differently curved segments 5 can be provided, which are used for returning the fallers 4. In the exemplary embodiment the fallers 4 have been shown rod-shaped, wherein their bodies 6 each have bearing studs 7 laterally.

Two rollers 8,9, are provided on each bearing stud 7 as pivot bearing elements. One of the two rollers 9 has a larger diameter $d_1$ than the other roller $d_2$. The roller with the larger diameter $d_1$ almost completely fills the guideway 1 and lies flat on the one roller path 10 of the guideway 1. The other roller 8 does not touch the surfaces delimiting the guideway 1, especially not the roller path 10.

FIG. 3 in particular shows the successive fallers 4 are provided with rollers 8 and 9 of a larger or smaller diameter in such a way, that alternately those machine elements 4 follow each other in which respectively the larger roller 9 is placed at the outside and the smaller roller 8 on the inside and, in the next faller 4 the smaller roller 8 is placed at the outside and the larger roller 9 on the inside. Arrows P1 and P2 show the direction of rotation of the respective rollers 8 and 9 when the fallers 4 are propelled in the direction of arrow P3. This makes clear that, based on the disposition in accordance with the present invention, only those rollers 8 or 9 having an opposite rotational direction roll against each other. This way it is assured that only a purely rolling friction occurs between the fallers 4 and the edges of the guideway 1 as well as between the machine elements 4 themselves. This makes possible the transfer of comparatively large forces at great operating speed in the direction of the arrow P3, i.e. parallel to the guideway.

FIG. 5 shows a schematic view of a regulating wheel 11, which turns around a center of revolution M and which may be disposed, e.g. in the area of segment 2 of the guideway 1 shown in FIG. 1. This regulating wheel 1 has on its perimeter a plurality of equidistantly disposed recesses 12, which act on the fallers 4 in the area of the bearing studs 7 and thereby can guide the fallers 4 correspondingly in this area. In addition, it can be provided for the regulating wheel 11 to be rotationally driven, so it correspondingly transfers its rotational movement to the fallers 4 in the form of a propulsive movement. Conversely, a propulsive movement generated by an arbitrary drive can be taken off the fallers 4 by means of the regulating wheel.

A special embodiment of the apparatus in accordance with the present invention is shown in FIG. 6, namely its embodiment as drawhead with linear propulsion. In a drawhead of this kind a plurality of fallers 4, having needles 13 disposed side-by-side, is disposed parallel to one another. The needles of these fallers act on a fleece which is to be drawn along a working area, such as the segment 3 of FIG. 1.

In the embodiment shown in FIG. 6 the disposition of the several fallers 4 is provided in several guideways, not shown in the drawing. The disposition is by means of rollers 9, whereas the distancing and force transfer, described in detail in connection with FIG. 3, between the several fallers is accomplished by roller combinations 8, 9, with rollers of different diameter. To drive the fallers 4, a linear induction motor drive as described in detail in U.S. Pat. No. 4406038 is used. Such a linear induction motor disposition includes a plurality of switchable solenoids 15 disposed along the guideway in series, which consist, respectively, each of a coil 16 and a core 17, and which create a forward movement together with an armature 18 provided on a faller 4.

The foregoing relates to preferred embodiments of the invention, it being understood that other variants and embodiments thereof are possible within the spirit and scope of the invention.

What is claimed is:

1. A drawhead for drawing equipment for the guidance and/or drive of a plurality of fallers disposed parallel to one another in a closed guideway having a support surface and kept at a predetermined distance from one another, wherein each faller has at least two pivot bearing elements of differing diameter, the pivot bearing elements being placed axially adjacent one another, the pivot bearing elements of adjacent fallers being disposed in such a manner that each pivot bearing element of larger diameter is adjoined in the direction of travel by two adjacent pivot bearing elements with a smaller diameter and that each pivot bearing element of smaller diameter is adjoined in the direction of travel by two adjacent pivot bearing elements with larger diameter, wherein the pivot axes of all pivot bearing elements are the same distance from said support surface of the guideway.

2. A device in accordance with claim 1, characterized in that the drive of the fallers is by means of a linear induction motor.

3. A device in accordance with claim 2, characterized in that each faller is provided with at least one armature.

4. A device in accordance with claim 1, wherein the pivot bearing elements are selected from the group consisting of ball bearings, roller bearings, and rocker bearings.

5. The device in accordance with claim 1, wherein each one of the axially adjacent bearing elements is independently supported for rotation about its pivot axis.

* * * * *